March 31, 1936. G. E. POPE 2,035,916
FRICTION CLUTCH MEMBER
Filed Dec. 6, 1933  3 Sheets-Sheet 1
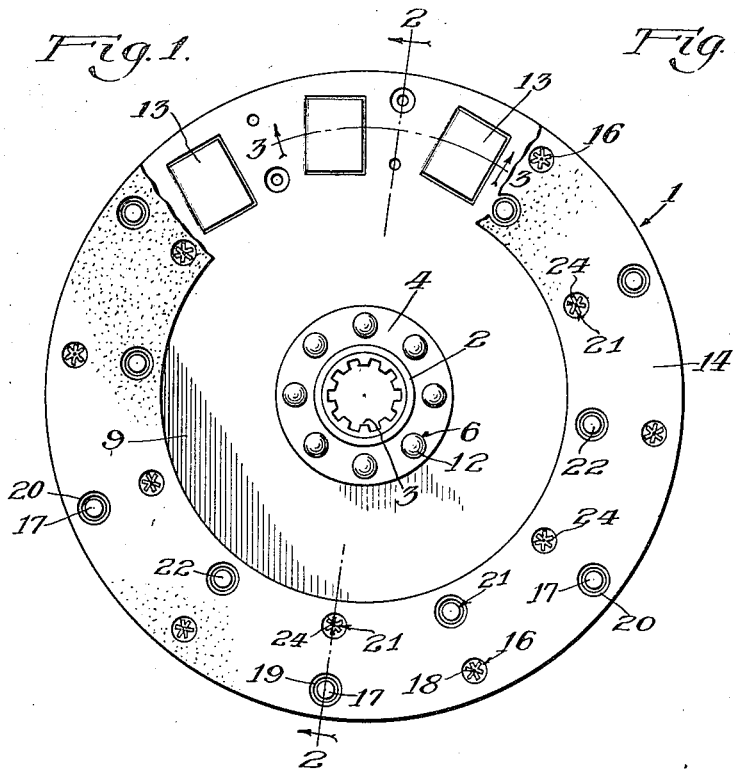
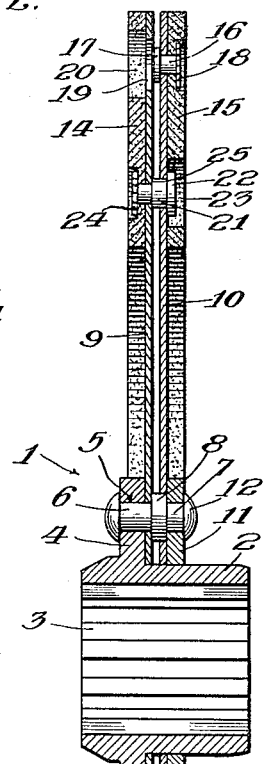
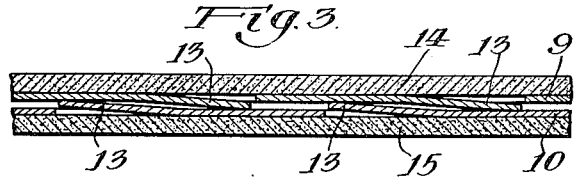
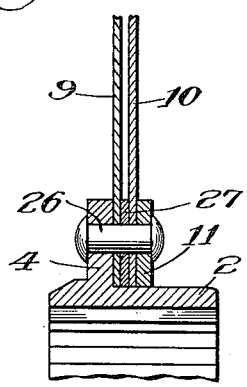
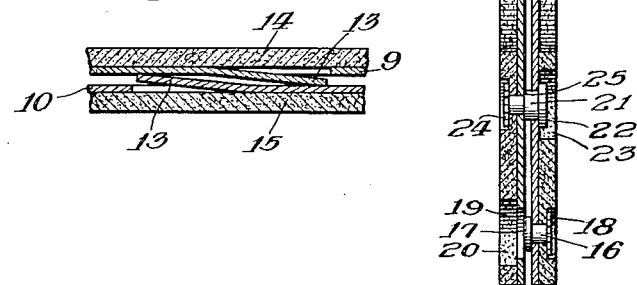
Inventor:
George E. Pope,
By Lee J. Gary
Attorney March 31, 1936.　　　G. E. POPE　　　2,035,916
FRICTION CLUTCH MEMBER
Filed Dec. 6, 1933　　　3 Sheets-Sheet 2
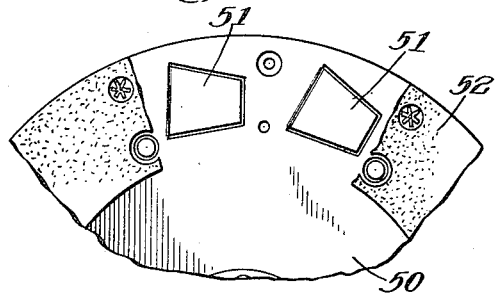
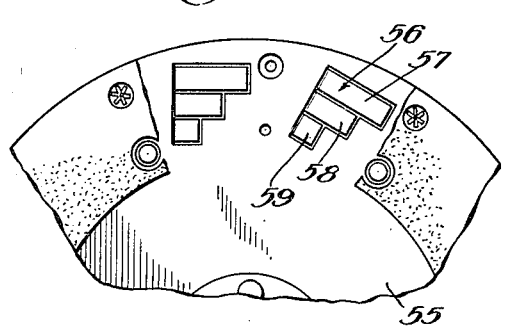
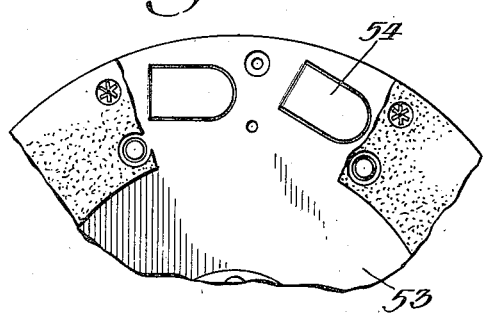
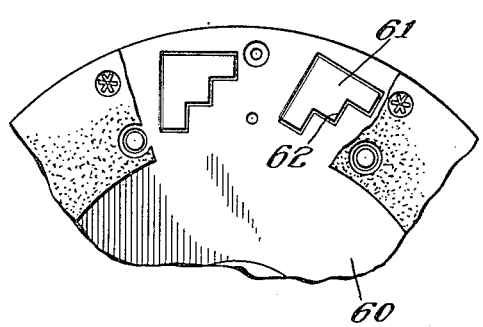
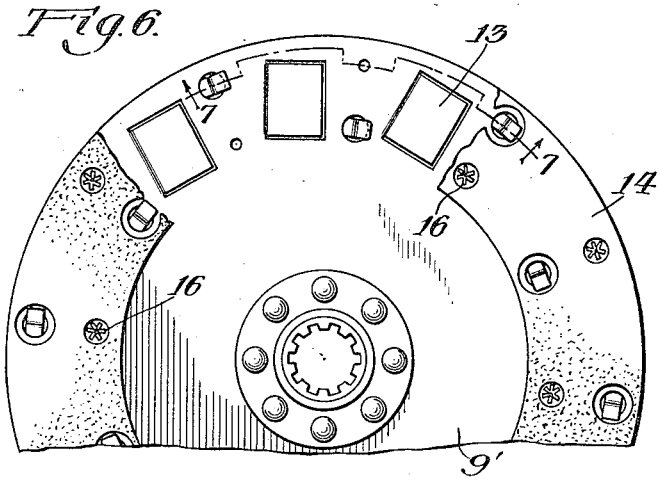
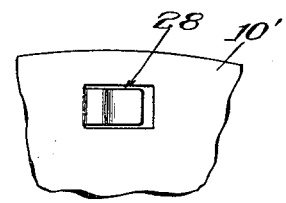
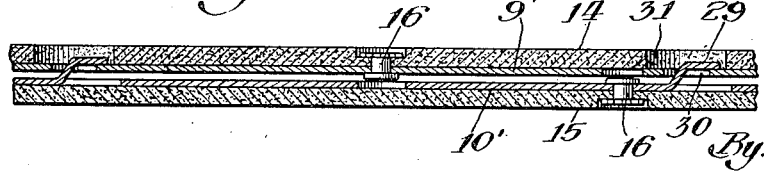
Inventor:
George E. Pope March 31, 1936.  G. E. POPE  2,035,916
FRICTION CLUTCH MEMBER
Filed Dec. 6, 1933   3 Sheets-Sheet 3
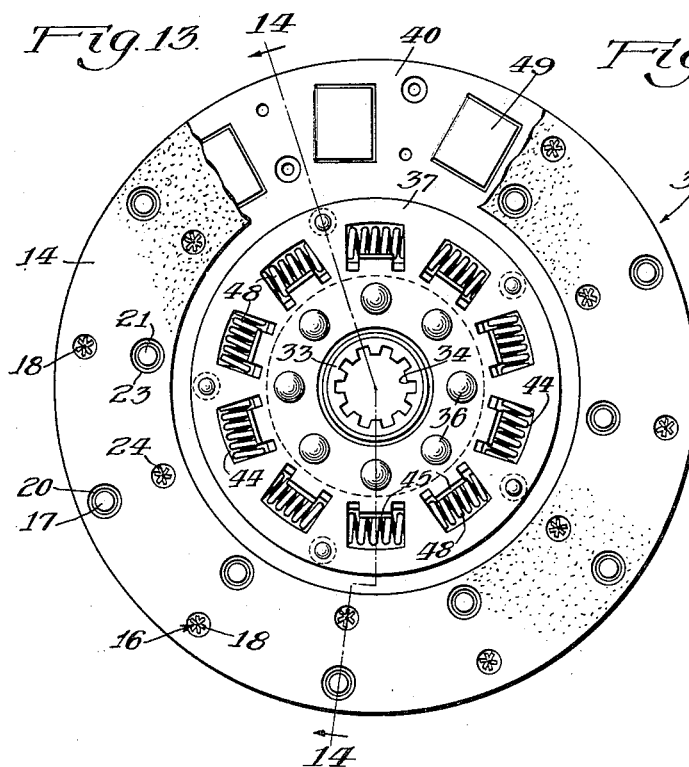
Fig. 13.
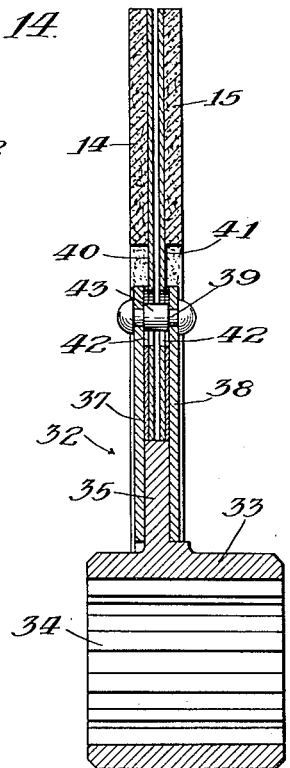
Fig. 14.
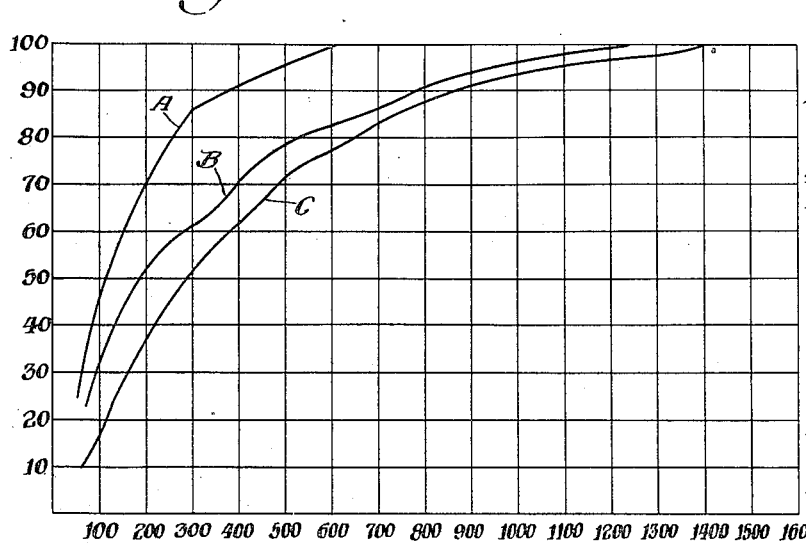
Fig. 15.
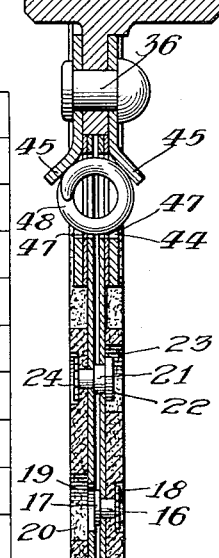
Inventor:
George E. Pope,
By: Lee J. Hary
Attorney Patented Mar. 31, 1936

2,035,916

UNITED STATES PATENT OFFICE 2,035,916

FRICTION CLUTCH MEMBER

George E. Pope, Bridgeport, Conn., assignor to Raybestos-Manhattan, Inc., Bridgeport, Conn., a corporation of New Jersey Application December 6, 1933, Serial No. 701,162

2 Claims. (Cl. 192—52)

This invention relates to improvements in clutch plate constructions and refers specifically to the provision of a clutch plate construction which permits a relatively resilient or cushioned engagement between a driving and driven member without sacrificing the efficiency of the friction facings or shortening the life of said facings.

The advantages and desirability of a resilient or cushioned engagement between the driving and driven member or members of a clutch mechanism are well recognized. Many constructions have heretofore been proposed which have been designed to impart resiliency or smoothness of engagement to clutches, but in substantially all instances the cushioning effect secured has been obtained at a sacrifice of efficiency and through subjecting the friction facings to excessive local wear.

One of the most common forms of prior art constructions which is in general exemplary of all of the rest comprises the provision of one or more clutch plates, the face or faces of which adjacent their periphery are distorted, corrugated or portions are struck up to form cantilever springs over which the friction facings are mounted. The friction facing thus more or less conforms to the irregular base upon which it is mounted and consequently presents a series of high and low areas or undulations. These undulations are, of course, purposely formed so that when the clutch ring or rings are brought into contact with the facings, said rings initially contact the high portions of the facings which, being supported by resilient tongues or corrugations, offer a degree of resiliency to the engagement. However, it can readily be seen that the clutch facings used in this manner are subjected to abnormal local wear at said high portions and the life of the facings is thereby materially reduced.

In my invention, resiliency is obtained in engagement of the driving and driven members without sacrificing the life of the friction facings, initial contact as well as contact throughout the entire throw of the clutch rings, of the entire area of said rings and the entire area of said facings being obtained.

Briefly described, my invention comprises the provision of a pair of parallel clutch plates mounted upon a hub, the faces of said plates adjacent their peripheries being provided with struck up cantilever tongues which extend inwardly so as to obtain contact between the tongues and the opposite plate. Clutch facings may be mounted upon the outer faces of said plates adjacent the plate peripheries and inasmuch as said outer faces are flat, said facings are maintained in flat condition. Consequently, when pressure is applied to the facings by the clutch rings the entire areas of said facings are brought into contact with said rings, and resiliency is obtained by flexing the cantilever tongues against the inner opposite faces of the plates.

Other objects and advantages of my invention will be apparent from the accompanying drawings and following detail description.

In the drawings, Fig. 1 is a top plan view, parts being broken away of an embodiment of a clutch plate comprising my invention.

Fig. 2 is a sectional view taken on line 2—2 of Fig. 1.

Fig. 3 is a sectional view taken on line 3—3 of Fig. 1.

Fig. 4 is a fragmentary sectional view of a modified form of hub attachment.

Fig. 5 is a fragmentary sectional view, showing the cantilever tongues initially compressed.

Fig. 6 is a view similar to Fig. 1 illustrating a modified form of means for limiting movement of the plates.

Fig. 7 is a sectional view taken on line 7—7 of Fig. 6.

Fig. 8 is a detail plan view of one of the plate movement limiting lugs.

Figs. 9, 10, 11 and 12 are fragmentary top plan views illustrating modified shapes of cantilever tongues.

Fig. 13 is a view similar to Fig. 1, illustrating my invention used with a clutch plate having torsion springs.

Fig. 14 is a sectional view taken on line 14—14 of Fig. 13.

Fig. 15 is a graph showing various pressure-deflection curves.

Referring in detail to the drawings, 1 indicates a clutch plate constructed according to the concepts of my invention. The plate 1 comprises hub 2, the internal portion of which may be provided with splines 3 which are adapted to engage the splines of a clutch shaft (not shown) whereby said clutch plate is slidable but non-rotatable upon said clutch shaft. An annular flange 4 may extend from the outer surface of the hub 2 and may be formed integral with said hub, said flange being provided with radially spaced openings for the reception of rivets 5. Each of the rivets 5 may be of restricted diameter throughout a substantial portion of its length as indicated at 6 and 7 in Fig. 2, an intermediate portion of said rivet being enlarged as shown at 8.

A pair of disks 9 and 10 may be mounted upon hub 2, said disks being preferably constructed of metal or other suitable material which has sufficient strength to meet the conditions under which the plate is used. Disk 9 may be provided with a plurality of apertures so spaced and of such diameter as to permit the insertion of the portion 6 of the rivets 5. When disk 9 is mounted upon hub 2, the inner portion of said disk may be confined between the annular flange 4 and the enlarged portions 8 of each of the rivets. In this manner disk 9 is rigidly mounted upon hub 2. Disk 10 may be provided with a plurality of apertures suitable in size to fit over the enlarged portions 8 of rivets 5. An annular ring 11 may be provided with a plurality of radially spaced apertures adapted to receive the restricted portions 7 of each of the rivets. It can readily be seen that ring 11, which is confined between the enlarged portions 8 and the heads 12 of the rivets 5, will be maintained rigid with respect to hub 2. The arrangement is such, however, that disk 10 may have limited movement with respect to disk 9, the outer movement being restricted by ring 11. The purpose of this construction will be hereinafter more fully described.

A plurality of tongues 13 may be struck up from the surfaces of the disks 9 and 10 adjacent their outer peripheries, said tongues being spaced on opposite disks in staggered relationship. The tongues 13 struck up from disk 9 may extend inwardly toward disk 10 and, the tongues 13 struck up from disk 10 may extend inwardly toward disk 9 so that a portion of the tongues from one disk contacts a portion of the plane surface of the opposite disk. In this manner the disks 9 and 10 are maintained in spaced relationship with respect to each other.

An annular friction facing 14 may be mounted upon the outer face of disk 9 and in like manner a friction facing 15 may be mounted upon a corresponding portion of disk 10, the facings 14 and 15 being constructed of a material having desirable frictional characteristics. As shown best in Figs. 1 and 2, the friction facing 15 may be maintained upon the face of disk 10 by means of rivets 16, said rivets being disposed in staggered relationship upon an inner and outer radius, as shown best in Fig. 1. The head 17 of each of the rivets 16 may be positioned on the inner face of disk 10 and the expanded portion 18 of said rivets may be positioned in recesses provided in the face of the friction material 15. An aperture 19 may be provided in disk 9 at a point opposite each of the rivet heads 17. In addition, an aperture 20 may be provided in the facing 14 adjacent each aperture 19. The friction facing 14 may be mounted upon disk 9 by means of rivets 21, the heads 22 of said rivets being positioned adjacent the outer face of disk 10, facing 15 being provided with apertures 23 adjacent each of said rivets. The expanded portion 24 of rivets 21 may be positioned in recesses provided in the face of friction material 14. The arrangement is such that friction facing 14 is rigidly mounted upon disk 9, the same being confined between the expanded portion 24 of the rivets 21 and shoulders 25 of said rivets. However, head 22 of each of the rivets 21 merely limits outward movement of disk 10 with respect to disk 9, disk 10 being movable toward disk 9.

It can readily be seen that by means of the struck-up tongues 13, disks 9 and 10 are maintained in spaced relationship, the outward movement of disk 10 with respect to disk 9 being limited by the heads 22 of rivets 21 and by ring 11. Consequently, disks 9 and 10 and, hence, friction facings 14 and 15, are normally maintained in fixed parallel relationship with respect to each other.

In operation, plate 1 may be slidably mounted upon the clutch shaft, the facings 14 and 15 being respectively positioned adjacent a driving member and a pressure actuated clutch ring (not shown). The driving member, of course is to be connected to the clutch shaft through the medium of the clutch plate. In the usual automobile clutch mechanism, the clutch ring is normally in contact with one of the friction facings impelling the clutch plate and the opposite friction facing into contact with another clutch ring or into contact with the flywheel of the internal combustion engine. When the clutch pedal is depressed, the pressure upon the clutch plate is relieved and consequently no connection exists between the internal combustion engine and the clutch shaft.

It can readily be seen that in using the clutch plate 1 when pressure of the clutch ring is exerted upon one of the friction facings tending to bring the opposite facing into contact with the driving member, the cantilever tongues 13 are flexed between the adjacent disks 9 and 10. In this manner a degree of resiliency is imparted to the clutch connection.

As a feature of my construction, the facings 14 and 15 are applied to the outer surfaces of the respective disks 9 and 10, said surfaces being relatively flat. Inasmuch as the cantilever tongues 13 are struck up inwardly from the facing, no high spots are produced upon the friction surfaces of the facings and, consequently, said surfaces are maintained in a flat condition. It can readily be seen, therefore, that the entire area of each of the facings 14 and 15 is brought into contact with respectively, the driving member and the clutch ring. This is true even at the initial contact of the clutch ring with the clutch facing. In this manner a smooth cushioned engagement is secured and since the entire area of the clutch facings are utilized, the life of said facings is accordingly not sacrificed. By means of the rivets 21 and the rivets 5, disk 10, when pressure is applied to the facings 14 and 15, is free to move in such a manner as to maintain the surfaces of said facings in parallelism. This, of course, further tends to obtain engagement of the entire area of the facings with the entire area of the driving member and the pressure member.

Referring particularly to Fig. 4, a slightly modified form of attachment of disks 9 and 10 to hub 2 is shown. Flange 4 carried by hub 2 may be provided with a plurality of radially spaced apertures for the reception of rivets 26 which are of uniform diameter thoughout their length. Disks 9 and 10 may be mounted upon hub 2 and may be confined between the annular flange 4 and ring 11, said disks being spaced from each other by means of an annular spacer 27 which may be provided with radially spaced apertures through which rivets 26 are adapted to pass. The remaining construction of the clutch plate may be similar to the structure of plate 1. In this construction, when pressure is applied to facings 14 and 15, disks 9 and 10 being fixed at the hub 2, will be slightly flexed. However, said disks possess sufficient inherent resiliency to permit said facings to be maintained substantially parallel when pressure is applied. This is particularly true when it is considered that the spacing between disks 9 and 10 is relatively slight as compared with the radius of said disks. In many instances this form of mounting may be preferred.

Referring particularly to Figs. 6, 7 and 8, a slightly modified means of limiting the spacing of the disks is shown. In this modification the hub construction and the means for mounting the disks upon said hub may be similar to that shown in Figs. 2 and 4. The disks may be provided with struck-up cantilever tongues 13 similar to the tongues described in conjunction with plate 1. The only difference in the construction resides in the substitution of members 28 for rivets 21, said members performing the same function as said rivets, in other words, said members are adapted to limit the movement of disks 9 and 10 away from each other. In the embodiment shown in Figs. 6, 7 and 8, a series of tongues 29 may be struck up from disk 10' which may correspond to disk 10. Disk 9' which corresponds to disk 9 may be provided with apertures 30 opposite the struck-up tongues 29 and in addition, facing 14 may also be provided with apertures 31 adjacent apertures 30. In this form of my invention each clutch facing 14 and 15 is secured upon the disks 9' and 10' by means of rivets 16 in a manner identical to the securing of facing 15 upon disk 10 in plate 1.

In assembling the form of my invention shown in Figs 6, 7 and 8, tongues 29 struck up from disk 10 may be inserted in apertures 30 provided in disk 9'. Disk 10' may then be slightly rotated with respect to disk 9' so as to cause tongues 29 to overlap those portions of disk 9' adjacent apertures 30, bringing the disks 9' and 10' into the position shown in Fig. 7. When this relative position is obtained the rivet apertures in the disks 9' and 10' adjacent hub 2 will be found to be in coincidence and said rivets may be adapted to secure disks 9' and 10' upon said hub in the manner described in conjunction with plate 1. It can readily be seen that in this form of my invention disks 9' and 10', being spaced from each other by means of the cantilever tongues 13', are free to move toward each other when said tongues are flexed. However, when the pressure upon the facings is released and disks 9' and 10' tend to separate from each other, the movement of the disks away from each other is limited by tongues 29.

Referring particularly to Figs. 13 and 14, another modified form of my invention is shown as utilized in conjunction with a clutch plate 32 having torsional resiliency. The plate 32 may comprise hub 33 having splines 34 upon its internal portion and an annular outwardly extending flange 35. Flange 35 may be provided with a plurality of radially spaced apertures for the reception of rivets 36 which may be adapted to secure spaced annular rings 37 and 38 to hub 33. Rings 37 and 38 may be provided with radially spaced apertures adjacent their outer peripheries for the reception of rivets 39. A pair of disks 40 and 41 may be carried between the spaced rings 37 and 38, said disks being provided intermediate their width with relatively enlarged apertures 42 which correspond in number and spacing to rivets 39. Rivets 39 may be relatively enlarged intermediate their lengths, as shown best at 43 in Fig. 14, whereby plates 37 and 38 are maintained in spaced relationship. The diameter of the enlarged portion 43 of the rivets 39, however, is less than the diameter of the apertures 42.

Rings 37 and 38 may be provided with a plurality of apertures 44, lugs 45 being struck up at an angle from said rings. Disks 40 and 41 may also be provided with apertures 47 corresponding in position and number to apertures 44. A coil spring 48 may be positioned within apertures 44 and 47, said springs being maintained within said apertures by means of lugs 45. The springs 48 may be in expanded condition and the ends thereof may be in contact with opposite edges of disks 40 and 41 and rings 37 and 38 defining apertures 44 and 47 respectively.

The faces of disks 40 and 41 adjacent the outer peripheries thereof may be provided with struck-up tongues 49, similar to tongues 13 and the function of said tongues is identical with the function of tongues 13. Friction facings 14 and 15 identical with the facings utilized in plate 1 may be mounted in an identical manner as the facings on plate 1, and the outer movement of said disks may be restrained in the same manner as with the disks 9 and 10.

The operation of plate 32 in a clutch mechanism is substantially similar to the operation of plate 1. Facings 14 and 15 are maintained in parallelism during engagement and all of the advantages of plate 1 are also inherent in plate 32. In addition, the construction is such that torsional resiliency is also obtained. It can readily be seen that when pressure is applied to facings 14 and 15 and motion of rotation is imparted to the clutch plate 32, a slight rotational movement of disks 40 and 41 takes place independent of hub 33. When the rotational force is first applied, disks 40 and 41 are shifted against the compression of springs 48, the opposite ends of said springs abutting rings 37 and 38. This relative movement, of course, is permitted by the oversize apertures 42 surrounding rivets 39. Consequently, clutch plate 32 in addition to possessing a degree of axil resiliency due to springs 49, also possesses a degree of torsional resiliency. Hence, the engagement of a clutch having a clutch plate or clutch plates of this construction is extremely cushioned and "velvety."

Referring particularly to Fig. 15, a graph is shown, drawn with pounds pressure as abscissae, that is, the spring pressure of the clutch ring against the friction facing and percentage deflection or collapse of the friction member as ordinates. In the usual automobile clutch mechanism the spring pressure is substantially proportionate to movement of the clutch pedal. A curve plotted between these coordinates determines the engaging characteristics of the clutch mechanism in regard to smoothness of engagement, for instance, curve A illustrates the characteristics of a clutch the friction member of which is deflected or collapsed more or less rapidly. As can be observed from the curve, 100% deflection is reached early in the travel of the clutch pedal considering that 1600 pounds is the maximum spring pressure exerted. Curve B indicates a clutch mechanism having more desirable engaging characteristics, the engagement being more or less gradual, complete collapse or deflection not being obtained until the clutch pedal has travelled substantially ¾ of its total distance. Curve C indicates the engagement characteristics of a clutch mechanism which is even superior to that indicated by curve B. It can be seen from curve C that engagement is relatively gradual and that complete deflection or collapse of the friction member does not occur until almost maximum spring pressure has been exerted. Both curves B and C are exemplary of the characteristics of clutch plates similar to plate 1 or plate 32, whereas curve A is exemplary of the characteristics of a clutch having the conventional type clutch plate.

Referring particularly to Figs. 9, 10, 11 and 12, clutch disks having different shaped cantilever tongues are shown. In the form shown in Fig. 9, the clutch disk 50 is provided adjacent its outer periphery with trapezoidal struck-up tongues 51, said tongues being struck up in a manner similar to tongues 13 and 49 in plates 1 and 32. Friction facings 52 may be mounted upon the face of each of the disks 50 in a manner similar to the mounting of facings 14 and 15 hereinbefore described.

In Fig. 10, clutch disk 53 may be provided with tongues 54 which may be rounded at their corners. Clutch disk 55 may be provided with tongues 56, each of which may comprise a plurality of separate cantilever strips 57, 58 and 59, the strips being of different length. In Fig. 12, disk 60 may be provided with tongues 61, the tongues being cut at their ends in a stepwise manner as shown best at 62 in Fig. 12.

As can be readily seen, inasmuch as the clutch disks are maintained in spaced relationship by means of the struck-up tongues, and as is well known, the deflection of the usual cantilever beam is dependent upon its length, area and cross sectional dimensions, means is provided for controlling the deflection or collapse of a friction member. In other words, by changing the shape of the tongues as indicated in Figs. 9, 10, 11 and 12, or by cutting said tongues in any other desired shape, the shape or contour of the pressure-deflection curve may be altered. Consequently, by the use of my invention, the engaging characteristics of a friction member may be so controlled as to obtain the desired degree of smoothness under any conditions.

I claim as my invention:
1. A clutch plate comprising in combination, a hub, an annular flange extending radially outwardly from said hub, a metal disk, rivets rigidly securing said metal disk to said hub, a second metal disk, positioned upon said rivets parallel to said first mentioned disk, said second disk being movable in planes parallel to said first mentioned disk, an annular ring rigidly mounted upon said rivets serving to limit outward motion of said movable disk with respect to said first mentioned disk, a friction facing mounted upon the outer face of each disk, the friction surfaces of said facings being flat and substantially parallel to each other and to said disks, a plurality of resilient tongues struck up inwardly from each disk from beneath the friction facing upon said disk toward said opposite disk to maintain said disks resiliently impelled away from each other.

2. A clutch plate comprising in combination, a hub, an annular flange extending radially outwardly from said hub, a metal disk, rivets rigidly securing said metal disk to said hub, said rivets having intermediate portions of enlarged diameter, a second metal disk positioned upon said enlarged portions of said rivets, said second disk being movable in planes parallel to said first mentioned disk, an annular ring rigidly mounted upon said rivets and clamped between said enlarged portions thereof and the heads of the rivets serving to limit outward motion of said movable disk with respect to said first mentioned disk, a friction facing mounted upon the outer face of each disk, the friction surfaces of said facings being flat and substantially parallel to each other and to said disks, a plurality of resilient tongues struck up inwardly from each disk from beneath the friction facing upon said disk toward said opposite disk to maintain said disks resiliently impelled away from each other.

GEORGE E. POPE.